United States Patent
Kuo et al.

(10) Patent No.: US 8,890,840 B2
(45) Date of Patent: Nov. 18, 2014

(54) METHOD AND APPARATUS FOR USING OSCILLATION SIGNALS WITH DIFFERENT PHASES TO DETECT CAPACITANCE VALUES AT CAPACITIVE SENSING NODES OF TOUCH PANEL

(71) Applicant: Mediatek Inc., Hsin-Chu (TW)

(72) Inventors: Chung-Jen Kuo, Hsin-Chu (TW); Pi-Hai Liu, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 118 days.

(21) Appl. No.: 13/719,170

(22) Filed: Dec. 18, 2012

(65) Prior Publication Data

US 2013/0285976 A1    Oct. 31, 2013

Related U.S. Application Data (60) Provisional application No. 61/640,007, filed on Apr. 30, 2012.

(51) Int. Cl.
*G06F 3/045* (2006.01)
*G06F 3/044* (2006.01)

(52) U.S. Cl.
CPC .................................... *G06F 3/044* (2013.01)
USPC ......................................................... 345/174

(58) Field of Classification Search
CPC ................................ G06F 3/044; G06F 3/0418
USPC .................................. 345/173–174; 178/18.06
See application file for complete search history.

(56) References Cited

U.S. PATENT DOCUMENTS

| 7,474,300 B2 | 1/2009 | Katsurahira |
| 2010/0060591 A1* | 3/2010 | Yousefpor et al. ............ 345/173 |
| 2010/0060593 A1 | 3/2010 | Krah |
| 2010/0170726 A1 | 7/2010 | Yeh |
| 2013/0021294 A1* | 1/2013 | Maharyta et al. ............ 345/174 |
| 2013/0207906 A1* | 8/2013 | Yousefpor et al. ............ 345/173 |

* cited by examiner

*Primary Examiner* — Liliana Cerullo
(74) *Attorney, Agent, or Firm* — Winston Hsu; Scott Margo (57) ABSTRACT

A method for detecting capacitance values of a plurality of capacitive sensing nodes located at intersections of a plurality of drive lines and a sense line on a touch panel is provided. The method includes at least the following steps: obtaining a plurality of touch sense signals corresponding to the sense line during a plurality of time slots, respectively; demodulating the touch sense signals with a first oscillation signal to generate a plurality of first demodulated signals; demodulating the touch sense signals with a second oscillation signal to generate a plurality of second demodulated signals, wherein the second oscillation signal is different from the first oscillation signal; and determining the capacitance values according to at least the first demodulated signals and the second demodulated signals.

14 Claims, 5 Drawing Sheets

METHOD AND APPARATUS FOR USING OSCILLATION SIGNALS WITH DIFFERENT PHASES TO DETECT CAPACITANCE VALUES AT CAPACITIVE SENSING NODES OF TOUCH PANEL

CROSS REFERENCE TO RELATED APPLICATIONS

This application claims the benefit of U.S. provisional application No. 61/640,007, filed on Apr. 30, 2012 and incorporated herein by reference.

BACKGROUND

The disclosed embodiments of the present invention relate to detecting capacitance values of a touch panel, and more particularly, to a method and apparatus for using oscillation signals with different phases to detect capacitance values (e.g., mutual capacitance values) at capacitive sensing nodes of a touch panel.

Touch panel devices are now widely used in a variety of applications to act as user interfaces. In general, a touch panel device may include a touch panel and a touch controller. Regarding certain applications, capacitive touch panels (e.g., mutual-capacitance touch panels) may be used. Thus, the touch controller generates a driving input to the capacitive touch panel, receives a sensing output generated from the capacitive touch panel, and refers to the sensing output to determine mutual capacitance values for detecting a touch event.

Regarding some touch panel systems, multiple drive lines (i.e., row traces) of the mutual-capacitance touch panel are stimulated simultaneously to generate composite sensing outputs at the sense lines (i.e., column traces). However, different drive lines may introduce different phase delays in the sensing outputs, which results in the complexity in determining the mutual capacitance values corresponding to intersections (i.e., crossover points) of drive lines and sense lines. Besides, as the phase delay would change along with the ambient temperature variation, the phase delay measurement and compensation may be inaccurate, thus degrading the overall touch-controlled system performance.

In view of the foregoing, there is a need for an innovative design which can correctly and efficiently determine capacitance values corresponding to intersections (i.e., crossover points) of drive lines and sense lines on a multi-stimulus touch panel.

SUMMARY

In accordance with exemplary embodiments of the present invention, a method and apparatus for using oscillation signals with different phases to detect capacitance values (e.g., mutual capacitance values) of capacitive sensing nodes of a touch panel are proposed to solve the above-mentioned problem.

According to a first aspect of the present invention, an exemplary method for detecting capacitance values of a plurality of capacitive sensing nodes located at intersections of a plurality of drive lines and a sense line on a touch panel is disclosed. The exemplary method includes: obtaining a plurality of touch sense signals from the sense line during a plurality of time slots, respectively; demodulating the touch sense signals with a first oscillation signal to generate a plurality of first demodulated signals; demodulating the touch sense signals with a second oscillation signal to generate a plurality of second demodulated signals, wherein the second oscillation signal is different from the first oscillation signal; and determining the capacitance values according to at least the first demodulated signals and the second demodulated signals.

According to a second aspect of the present invention, an exemplary touch controller for detecting capacitance values of a plurality of capacitive sensing nodes located at intersections of a plurality of drive lines and a sense line on a touch panel is disclosed. The exemplary touch controller includes a first demodulator, a second demodulator, and a determining unit. The first demodulator is arranged for demodulating a plurality of touch sense signals corresponding to the sense line with a first oscillation signal to generate a plurality of first demodulated signals, wherein the touch sense signals are obtained during a plurality of time slots, respectively. The second demodulator is arranged for demodulating the touch sense signals with a second oscillation signal to generate a plurality of second demodulated signals, wherein the second oscillation signal is different from the first oscillation signal. The determining unit is arranged for determining the capacitance values according to at least the first demodulated signals and the second demodulated signals.

According to a third aspect of the present invention, an exemplary non-transitory machine readable medium storing a program code is disclosed. When executed by a processor, the program code causes the processor to perform following steps for detecting capacitance values of a plurality of capacitive sensing nodes located at intersections of a plurality of drive lines and a sense line on a touch panel: demodulating a plurality of touch sense signals corresponding to the sense line with a first oscillation signal to generate a plurality of first demodulated signals, wherein the touch sense signals are obtained during a plurality of time slots, respectively; demodulating the touch sense signals with a first oscillation signal to generate a plurality of first demodulated signals; demodulating the touch sense signals with a second oscillation signal to generate a plurality of second demodulated signals, wherein the second oscillation signal is different from the first oscillation signal; and determining the capacitance values according to at least the first demodulated signals and the second demodulated signals.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to use oscillation signals with different phases to demodulate touch sense signals of a sense line to generate different demodulation results, and then use the demodulation results to determine capacitance values of capacitive sensing nodes located at intersections of a plurality of drive lines and the sense line. For example, the capacitance values can be directly obtained by calculating root sum square (RSS) values according to the demodulation results. Hence, the proposed method does not need any phase delay measurement and compensation. Compared to the conventional design, the proposed capacitance value detection methodology would have reduced complexity and improved accuracy. Further details are detailed as below.

Figure 1:
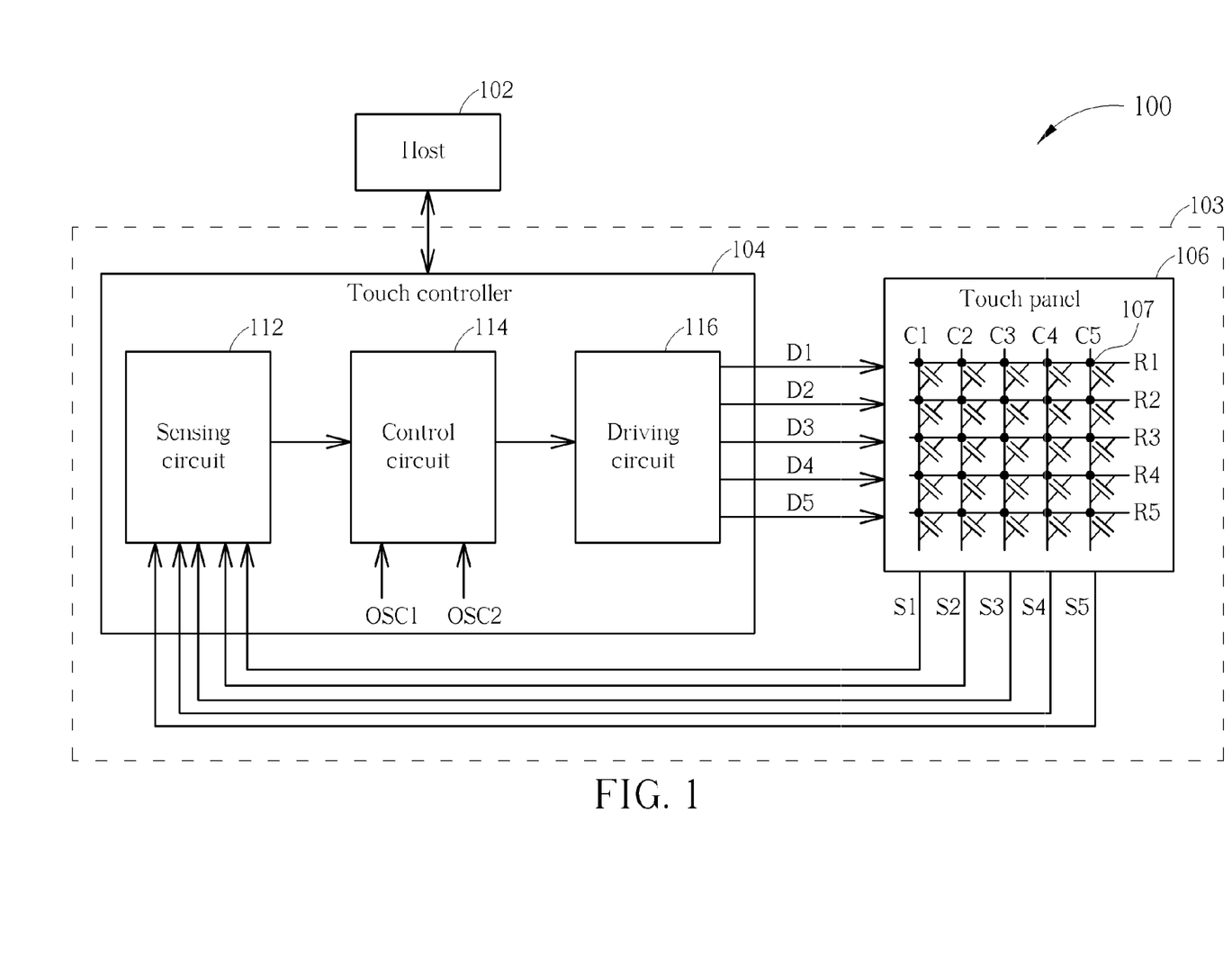
FIG. 1 is a block diagram illustrating a computer system employing the proposed capacitance value detection methodology according to an embodiment of the present invention.

FIG. 1 is a block diagram illustrating a computer system employing the proposed capacitance value detection methodology according to an embodiment of the present invention. The computer system 100 has a host 102 and a touch panel device 103, where the touch panel device 103 includes a touch controller 104 and a touch panel 106. The touch panel 106 includes a capacitive sensing medium having a plurality of drive lines (i.e., row traces) R1, R2, R3, R4, R5 and a plurality of sense lines (i.e., column traces) C1, C2, C3, C4, C5. The drive lines and the sense lines are formed by a transparent conductive material such as Indium Tin Oxide (ITO). In this embodiment, the drive lines and the sense lines are arranged in a matrix form such that the drive lines and the sense lines, as shown in FIG. 1, are perpendicular to each other. It should be noted that, at each intersection 107 of one drive line and one sense line, there is no direct electrical contact between the drive line and the sense line. In other words, the intersection 107 is a crossover point where the drive line and the sense line pass cross each other. As a result, the intersection 107 may be regarded as a capacitive sensing node due to the fact that the drive line and the sense line at the intersection 107 can essentially form two electrodes of a capacitor. It should be noted that the number of drive lines, the number of sense lines and/or the arrangement of drive lines and sense lines are for illustrative purposes only.

The touch controller 104 is used to detect the capacitance variation at each capacitive sensing node for determining occurrence and coordinate of a touch event. Hence, in each frame, the touch controller 104 has to determine a capacitance value at each capacitive sensing node. As shown in FIG. 1, the touch controller 104 includes a sensing circuit 112, a control circuit 114 and a driving circuit 116. In this embodiment, the touch panel 106 is driven in a multi-stimulus manner. Therefore, the drive lines R1-R5 are simultaneously stimulated with a plurality of alternating current (AC) signals (i.e., stimulation signals) D1, D2, D3, D4, D5 generated from the driving circuit 116.

Figure 2:
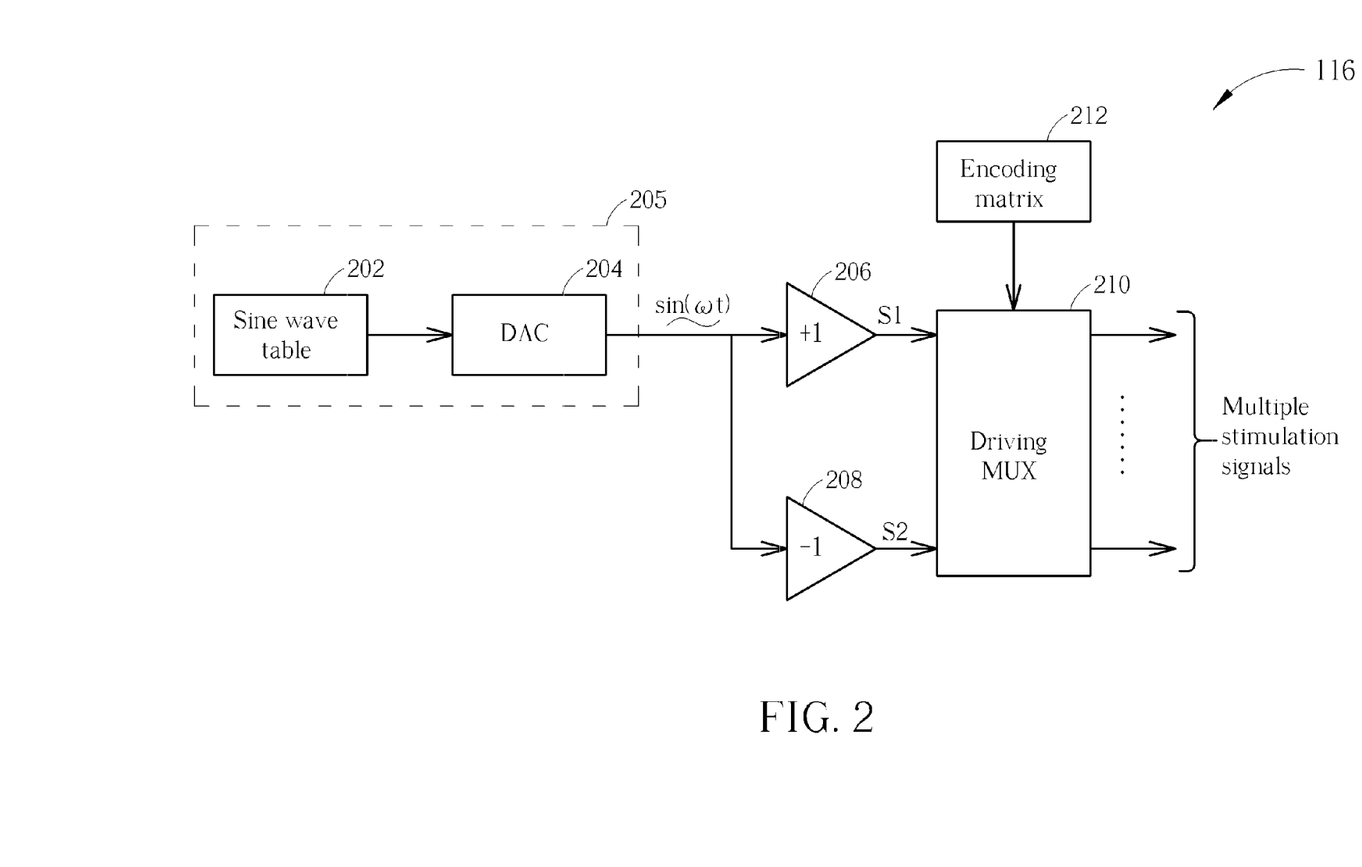
FIG. 2 is a diagram illustrating an embodiment of the driving circuit shown in FIG. 1.

Please refer to FIG. 2, which is a diagram illustrating an embodiment of the driving circuit 116 shown in FIG. 1. In this embodiment, the driving circuit 116 includes a sine wave table 202, a digital-to-analog converter (DAC) 204, a plurality of driving buffer amplifiers 206, 208, a driving multiplexer (MUX) 210, and an encoding matrix 212. The combination of sine wave table 202 and DAC 204 serves as a signal generator used to provide a common modulation carrier $\sin(\omega t)$. Specifically, the sine wave table 202 outputs a digital amplitude value representative of the signal amplitude for an instant frequency value of the modulation angular frequency w, and then the DAC 204 converts the digital amplitude value into an analog signal. In this way, by continuously converting the digital amplitude values provided from the since wave table 202, the DAC 204 therefore generates a time-varying analog signal which is an approximation of a sine wave signal $\sin(\omega t)$. The common modulation carrier $\sin(\omega t)$ is fed into both of the driving buffer amplifiers 206 and 208, each making the common modulation carrier $\sin(\omega t)$ equipped with proper driving capability for driving following stages.

In this embodiment, the driving buffer amplifier 206 has a positive gain value equal to +1, and the driving buffer amplifier 208 has a negative gain value equal to −1. Thus, the amplifier output S1 of the driving buffer amplifier 206 would be $+\sin(\omega t)$, while the amplifier output S2 of the driving buffer amplifier 206 would be $-\sin(\omega t)$. The driving MUX 210 refers to the encoding matrix 212 to select one of the amplifier outputs S1 and S2 as a stimulation signal. Specifically, the stimulation signals simultaneously generated from the driving MUX 210 are set by the common modulation carrier $\sin(\omega t)$ and a plurality of sign values defined in the encoding matrix 212.

Supposing that a touch panel has n drive lines, the detection time of one frame is divided into n time slots. Taking the touch panel 106 for example, the detection time of one frame is divided into 5 time slots since the touch panel 106 has 5 drive lines R1-R5. During the $i^{th}$ time slot, the stimulation signal supplied to the $k^{th}$ drive line is represented by $a_{ik}$, where $a_{ik} = D_{ik} \sin(\omega t)$, $\omega = 2\pi f_c$, $f_c$ is the stimulus frequency (i.e., the modulation carrier frequency), and $D_{ik}$ is the sign value defined in the encoding matrix 212. It should be noted that $D_{ik}$ is either +1 or −1, depending upon the setting of the encoding matrix 212. Therefore, regarding the mutual capacitance detection in one frame, the stimulation signals simultaneously generated during different time slots may be represented by the following n×n driving matrix A:

$$A \equiv \begin{bmatrix} a_{11} & a_{12} & \cdots & a_{1n} \\ a_{21} & a_{22} & & \\ \vdots & & \ddots & \\ a_{n1} & & \cdots & a_{nn} \end{bmatrix}$$

where the $1^{st}$ row $[a_{11} \, a_{12} \, \ldots \, a_{1n}]$ represents the stimulation signals simultaneously generated during the $1^{st}$ time slot of a frame, the $2^{nd}$ row $[a_{21} \, a_{22} \, a_{2n}]$ represents the stimulation signals simultaneously generated during the $2^{nd}$ time slot of the frame, and the $n^{th}$ row $[a_{11} \, a_{12} \, \ldots \, a_{1n}]$ represents the stimulation signals simultaneously generated during the $n^{th}$ time slot of the frame. For example, regarding the touch panel 106 with 5 drive lines R1-R5, the following encoding matrix D may be employed.

$$D = \begin{bmatrix} +1 & -1 & +1 & -1 & +1 \\ -1 & +1 & -1 & +1 & +1 \\ +1 & -1 & +1 & +1 & -1 \\ -1 & +1 & +1 & -1 & +1 \\ +1 & +1 & -1 & +1 & -1 \end{bmatrix}$$

Therefore, during the 1$^{st}$ time slot, the driving MUX 210 outputs +sin(ωt), −sin(ωt), +sin(ωt), −sin(ωt), +sin(ωt) as the stimulation signals D1-D5, respectively. During the 2$^{nd}$ time slot, the driving MUX 210 outputs −sin(ωt), +sin(ωt), −sin(ωt), +sin(ωt), +sin(ωt) as the stimulation signals D1-D5, respectively. During the 3rd time slot, the driving MUX 210 outputs +sin(ωt), −sin(ωt), +sin(ωt), +sin(ωt), −sin(ωt) as the stimulation signals D1-D5, respectively. During the 4$^{th}$ time slot, the driving MUX 210 outputs −sin(ωt), +sin(ωt), +sin(ωt), −sin(ωt), +sin(ωt) as the stimulation signals D1-D5, respectively. During the 5$^{th}$ time slot, the driving MUX 210 outputs +sin(ωt), +sin(ωt), −sin(ωt), +sin(ωt), −sin(ωt) as the stimulation signals D1-D5, respectively. As a result, all of the stimulation signals generated within one frame can be represented by the following 5×5 driving matrix A.

$$A = \begin{bmatrix} +\sin\omega t & -\sin\omega t & +\sin\omega t & -\sin\omega t & +\sin\omega t \\ -\sin\omega t & +\sin\omega t & -\sin\omega t & +\sin\omega t & +\sin\omega t \\ +\sin\omega t & -\sin\omega t & +\sin\omega t & +\sin\omega t & -\sin\omega t \\ -\sin\omega t & +\sin\omega t & +\sin\omega t & -\sin\omega t & +\sin\omega t \\ +\sin\omega t & +\sin\omega t & -\sin\omega t & +\sin\omega t & -\sin\omega t \end{bmatrix}$$

Regarding each sense line, the capacitance values at the capacitive sensing nodes (i.e., intersections of the n drive lines and one sense line) may be represented by the following n×1 matrix X:

$$x \equiv \begin{bmatrix} c_1 e^{j\theta_1} \\ c_2 e^{j\theta_2} \\ \vdots \\ c_n e^{j\theta_n} \end{bmatrix}$$

where $C_i$ represents the capacitance value at the capacitive sensing node located at an intersection of the sense line and the i$^{th}$ drive line, and $e^{j\theta_i}$ represents the phase delay introduced by the i$^{th}$ drive line, where $j=\sqrt{-1}$.

As mentioned above, the driving circuit 116 simultaneously drives n drive lines (e.g., R1-R5) with respective stimulation signals (e.g., D1-D5), thus resulting in mutual capacitance values simultaneously introduced at the capacitive sensing nodes of the same sense line. As a result, each sensing output read from a sense line is a composite signal resulting from all mutual capacitance values simultaneously presented at the capacitive sensing nodes of different drive lines and the sense line. Besides, as one frame time is divided into n time slots, the same sense line would produce n sensing outputs during one frame time, where each sensing output is generated in response to one set of stimulation signals simultaneously generated during one time slot. The touch sense signals derived from one sense line in one frame time may be represented by the following n×1 matrix B:

$$B \equiv \begin{bmatrix} b_1 \\ b_2 \\ \vdots \\ b_n \end{bmatrix}$$

where $b_i$ is the sensing output read from the sense line during the i$^{th}$ time slot. As can be readily known from above, the matrices A, x and B would have the following relation: Ax=B.

Figure 3:
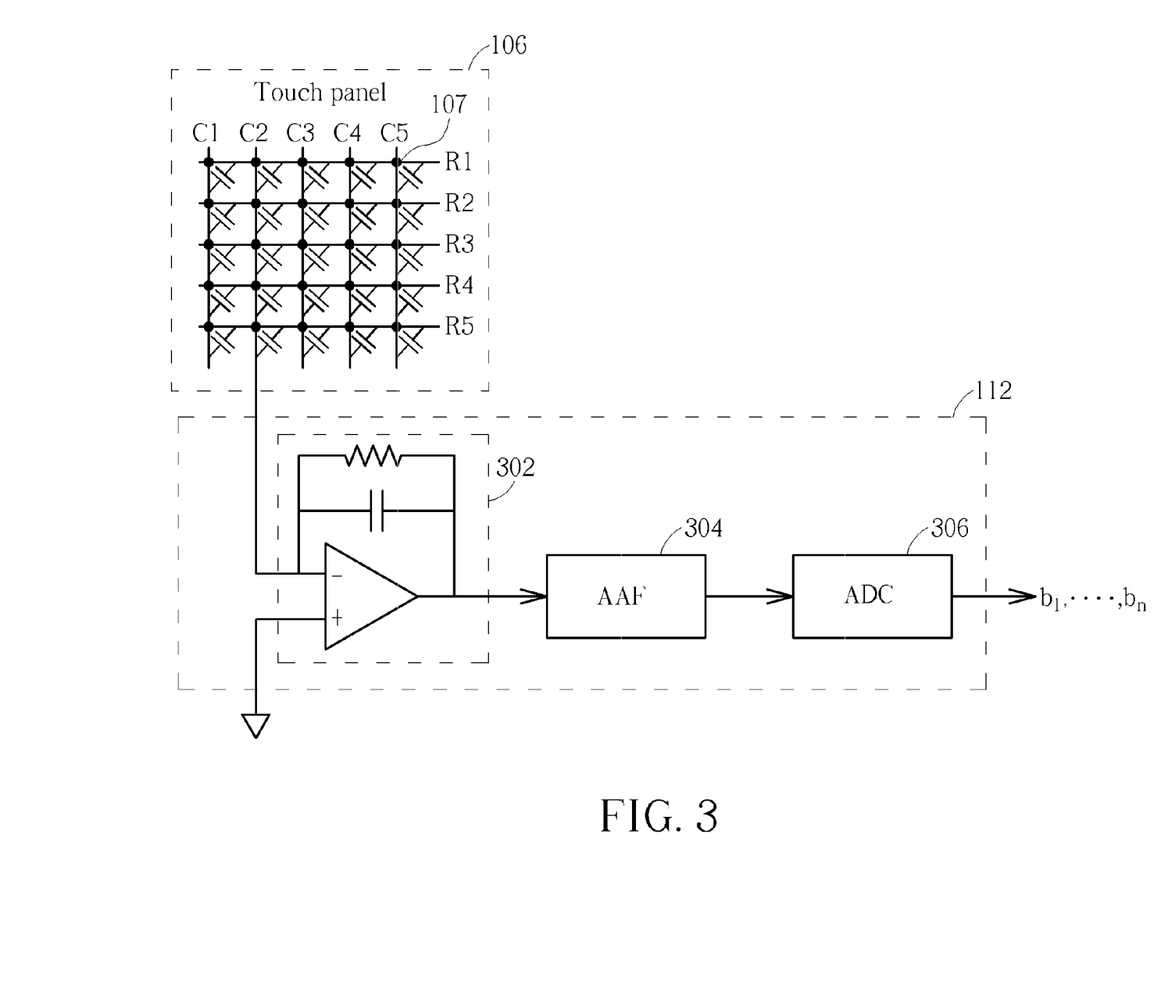
FIG. 3 is a diagram illustrating an embodiment of the sensing circuit shown in FIG. 1.

In this embodiment, the sensing circuit 112 is arranged for obtaining a plurality of touch sense signals (e.g., $b_1$-$b_n$) corresponding to the same sense line during a plurality of time slots (e.g., n time slots), respectively. Please refer to FIG. 3, which is a diagram illustrating an embodiment of the sensing circuit 112 shown in FIG. 1. The sensing circuit 112 includes a transducer amplifier 302, an anti-aliasing filter (AAF) 304 and an ADC 306. An analog sensing output of one sense line is fed into the transducer amplifier 302. The amplifier output of the transducer amplifier 302 is processed by the AAF 304 to restrict the bandwidth of the amplifier output to approximately satisfy the sampling theorem. Next, the ADC 306 converts the filter output of the AAF 304 into a digital touch sense signal. In this way, the touch sense signals $b_1$-$b_n$ in one frame time are obtained by the sensing circuit 112. It should be noted that only one signal processing channel for obtaining touch sense signals $b_1$-$b_n$ corresponding to one sense line is shown in FIG. 3. In practice, the sensing circuit 112 may be configured to have a plurality of signal processing channels, each composed of a transducer amplifier, an AAF and an ADC, for obtaining touch sense signals of a plurality of sense lines.

Taking the touch panel 106 with 5 sense lines C1-C5 for example, the sensing output S1 is a composite signal resulting from all capacitance values simultaneously introduced at the capacitive sensing nodes of the drive lines R1-R5 and the sense line C1, and the sensing circuit 112 reads the sense line C1 in each time slot of one frame to thereby obtain five touch sensing signals. Similarly, the sensing circuit 112 also reads the sense line C2 in each time slot of one frame to thereby obtain five touch sensing signals, reads the sense line C3 in each time slot of one frame to thereby obtain five touch sensing signals, reads the sense line C4 in each time slot of one frame to thereby obtain five touch sensing signals, and reads the sense line C5 in each time slot of one frame to thereby obtain five touch sensing signals.

As mentioned above, the touch controller 104 is used to detect the capacitance variation at each capacitive sensing node for determining the occurrence and coordinate of a touch event. Thus, regarding each sense line, the touch controller 104 is required to know capacitance values $c_1$-$c_n$ at the capacitive sensing nodes located at intersections of the sense line and multiple drive lines that are stimulated simultaneously. In this embodiment, the control circuit 114 uses two different oscillation signals OSC1 and OSC2 to demodulate the touch sensing signals corresponding to the same sense line, respectively. For example, the first oscillation signal OSC1 and the second oscillation signal OSC2 have a 90-degree phase difference therebetween. Hence, the control circuit 114 obtains first demodulated signals due to the first oscillation signal OSC1, and obtains second demodulated signals due to the second oscillation signal OSC2.

Next, based on the first demodulated signals and second demodulated signals, the control circuit 114 of the present invention can determine the capacitance values $c_1$-$c_n$ without any phase delay measurement and compensation. After the capacitance values at capacitive sensing nodes of all sense lines are determined, the control circuit 114 may judge the occurrence of a touch event. When it is determined that there is a touch event, the control circuit 114 may transmit information (e.g., coordinate) associated with the touch event to the host 102. Next, the host 102 performs actions based on the output given by the touch controller 104. For example, the actions may include moving an object such as a cursor or pointer, scrolling, panning, etc. Further details directed to determining the capacitance values $c_1$-$c_n$ of capacitive sensing nodes located at intersections of one sense line and a plurality of drive lines are described as below.

Figure 4:
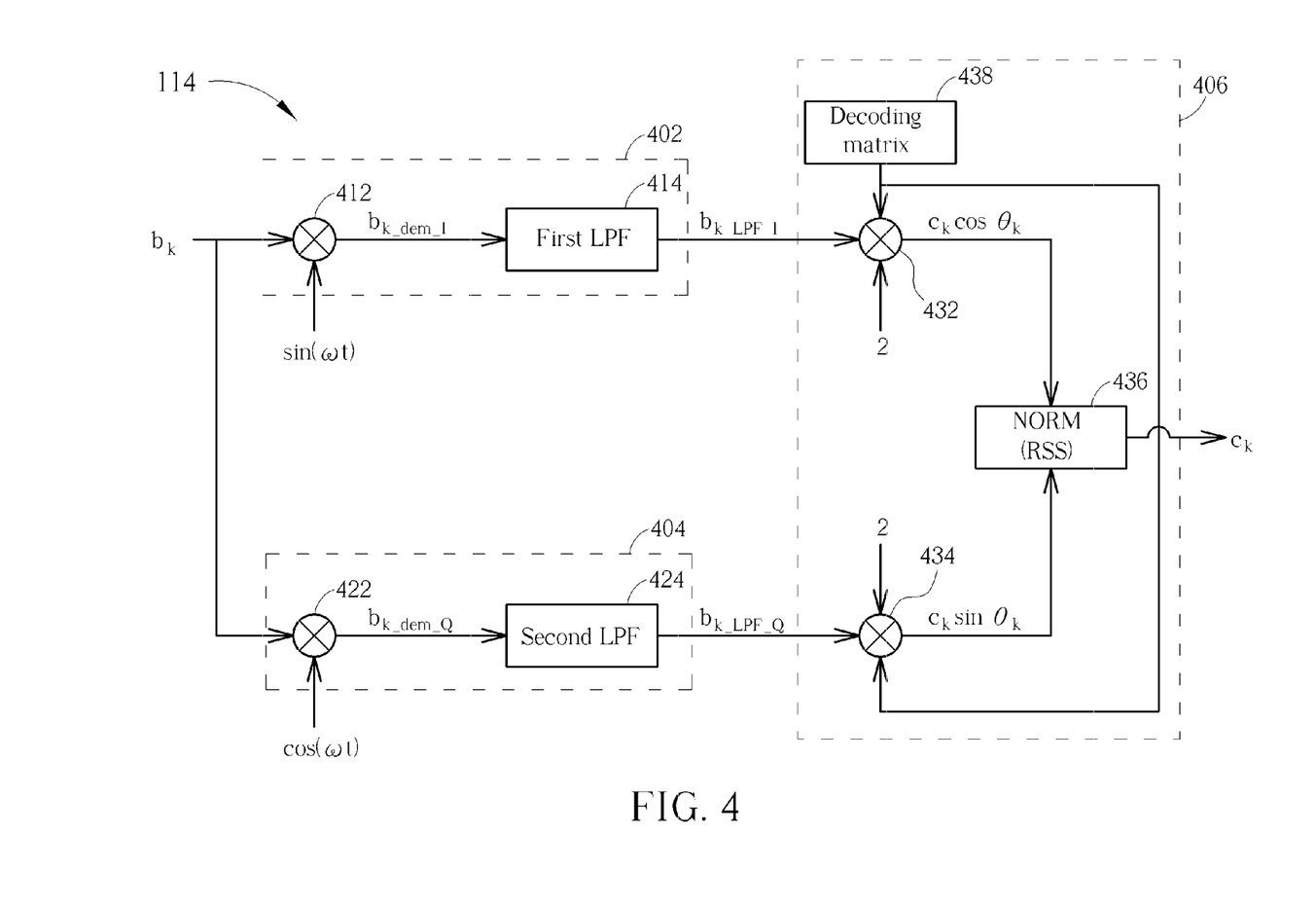
FIG. 4 is a diagram illustrating an embodiment of the control circuit shown in FIG. 1.

Please refer to FIG. 4, which is a diagram illustrating an embodiment of the control circuit 114 shown in FIG. 1. The control circuit 114 includes a first demodulator 402, a second demodulator 404 and a determining unit 406. The first demodulator 402 is arranged for demodulating the touch sense signals $b_k$ (k=1 to n) with the first oscillation signal OSC1 to generate a plurality of first demodulated signals $b_{k\_LPF\_I}$ (k=1 to n). The second demodulator 404 is arranged for demodulating the touch sense signals $b_k$ (k=1 to n) with the second oscillation signal OSC2 to generate a plurality of second demodulated signals $b_{k\_LPF\_Q}$ (k=1 to n). By way of example, but not limitation, the first oscillation signal OSC1, the second oscillation signal OSC2, and the stimulation signals (e.g., D1-D5) have the same frequency, and the stimulation signals (e.g., D1-D5) and one of first oscillation signal OSC1 and second oscillation signal OSC2 have the same phase. In this embodiment, the first oscillation signal OSC1 may be $\sin(\omega t)$, and the second oscillation signal OSC2 may be $\cos(\omega t)$.

More specifically, the first demodulator 402 includes a first mixer 412 and a first low-pass filter (LPF) 414, where the first mixer 412 is arranged for mixing each touch sense signal $b_k$ with the first oscillation signal $\sin(\omega t)$ to generate a corresponding first mixed signal $b_{k\_dem\_I}$, and the first LPF 414 is arranged for performing a low-pass filtering operation upon the first mixed signal $b_{k\_dem\_I}$ to generate a corresponding first demodulated signal $b_{k\_LPF\_I}$. Regarding the second demodulator 404, it includes a second mixer 422 and a second LPF 424, where the second mixer 422 is arranged for mixing each touch sense signal $b_k$ with the second oscillation signal $\cos(\omega t)$ to generate a corresponding second mixed signal $b_{k\_dem\_Q}$, and the second LPF 424 is arranged for performing a low-pass filtering operation upon the second mixed signal $b_{k\_dem\_Q}$ to generate a corresponding second demodulated signal $b_{k\_LPF\_Q}$.

As mentioned above, the matrices A, x and B would have the following relation: Ax=B. Thus, regarding one touch sensing signal $b_k$ read from a sense line during the $k^{th}$ time slot, it may be expressed using the following equation.

$$b_k = a_{k1}c_1 e^{j\theta_1} + a_{k2}c_2 e^{j\theta_2} + \ldots + a_{kn}c_n e^{j\theta_n}$$
$$= \sum_{i=1}^{n} a_{ki} c_i e^{j\theta_i}$$
$$= \sum_{i=1}^{n} D_{ki} c_i \sin(\omega t + \theta_i)$$

Thus, the first mixed signal $b_{k\_dem\_I}$ can be expressed using the following equation.

$$b_{k\_dem\_I} \equiv b_k \cdot \sin\omega t = \sum_{i=1}^{n} D_{ki} c_i \left(-\frac{1}{2}\right)(\sin(2\omega t + \theta_i) - \cos\theta_i)$$

Similarly, the second mixed signal $b_{k\_dem\_Q}$ can be expressed using the following equation.

$$b_{k\_den\_Q} \equiv b_k \cdot \cos\omega t = \sum_{i=1}^{n} D_{ki} c_i \left(\frac{1}{2}\right)(\sin(2\omega t + \theta_i) + \sin\theta_i)$$

The first LPF 414 is used to filter out high-frequency terms (i.e., $\sin(2\omega t+\theta_i)$), thus only leaving the low-frequency terms (i.e., $\cos\theta_i$). Hence, the first demodulated signal $b_{k\_LPF\_I}$ can be expressed using the following equation.

$$b_{k\_LPF\_I} \equiv LPF(b_{k\_dem\_I}) = LPF(b_k \sin\omega t) = \frac{1}{2}\sum_{i=1}^{n} D_{ki} c_i \cos\theta_i$$

Similarly, the second LPF 424 is used to filter out high-frequency terms (i.e., $\sin(2\omega t+\theta_i)$), thus only leaving the low-frequency terms (i.e., $\sin\theta_i$). Hence, the second demodulated signal $b_{k\_LPF\_Q}$ can be expressed using the following equation.

$$b_{k\_LPF\_Q} \equiv LPF(b_{k\_dem\_Q}) = LPF(b_k \cos\omega t) = \frac{1}{2}\sum_{i=1}^{n} D_{ki} c_i \sin\theta_i$$

The determining unit 406 is arranged for determining the capacitance value $c_k$ according to at least the first demodulated signals $b_{k\_LPF\_Q}$ and the second demodulated signals $b_{k\_LPF\_Q}$, where k=1 to n. As shown in FIG. 4, the determining unit 406 includes a first multiplication unit 432, a second multiplication unit 434, and a calculation unit (denoted by "NORM (RSS)") 436. With proper data manipulation, the scaling factor ½ in each first demodulated signal $b_{k\_LPF\_Q}$ and second demodulated signal $b_{k\_LPF\_Q}$ can be removed. Besides, the first multiplication unit 432 performs matrix multiplication according to a decoding matrix 438 and the first demodulated signals $b_{k\_LPF\_I}$, and accordingly generates a plurality of first matrix elements $c_k \cos\theta_k$, where k=1 to n. Similarly, the second multiplication unit 434 performs matrix multiplication according to the decoding matrix 438 and the second demodulated signals $b_{k\_LPF\_Q}$, and accordingly generates a plurality of second matrix elements $c_k \sin\theta_k$, where k=1 to n. It should be noted that the decoding matrix 438 is an inverse of the encoding matrix 212. Considering the case where the touch panel 106 has 5 drive lines R1-R5 and the aforementioned encoding matrix D is employed, the following decoding matrix $D^{-1}$ may be used by the determining unit 406 (it should be noted that the result of D multiplied by $D^{-1}$ would be an identity matrix).

$$D^{-1} = \begin{bmatrix} 1 & 0 & 0 & 0 & 1 \\ 0 & 0 & 0 & 1 & 1 \\ 0 & 0 & 1 & 1 & 0 \\ 0 & 1 & 1 & 0 & 0 \\ 1 & 1 & 0 & 0 & 0 \end{bmatrix}$$

The output of the first multiplication unit 432 may be expressed using the following equation.

$$\begin{bmatrix} c_1 \cos\theta_1 \\ c_2 \cos\theta_2 \\ \vdots \\ c_n \cos\theta_n \end{bmatrix} = D^{-1} \begin{bmatrix} b_{1\_LPF\_I} \\ b_{2\_LPF\_I} \\ \vdots \\ b_{n\_LPF\_I} \end{bmatrix}$$

Similarly, the output of the second multiplication unit 434 may be expressed using the following equation.

$$\begin{bmatrix} c_1\sin\theta_1 \\ c_2\sin\theta_2 \\ \vdots \\ c_n\sin\theta_n \end{bmatrix} = D^{-1} \begin{bmatrix} b_{1\_LPF\_Q} \\ b_{2\_LPF\_Q} \\ \vdots \\ b_{n\_LPF\_Q} \end{bmatrix}$$

It should be noted that the angle values $\theta_k$ (k=1 to n) result from the phase delays, and will change along with the ambient temperature variation. Even though the angle values $\theta_k$ (k=1 to n) are unknown variables, the desired capacitance values $c_k$ (k=1 to n) can be easily known by arithmetical calculations. In this embodiment, the calculation unit 436 is arranged for determining each capacitance value $c_k$ by calculating a root sum square (RSS) value of each pair of one first matrix element $c_k \cos\theta_k$ and one second matrix element $c_k \sin\theta_k$. That is, if the second matrix element $c_i \sin\theta_i$ serves as an imaginary part of a complex value and first matrix element $c_i \cos\theta_i$ serves as a real part of the complex value, the norm of the complex value (i.e., an RSS value of $c_i \sin\theta_i$ and $c_i \cos\theta_i$) is calculated using the following equation.

$$c_i = \sqrt{(c_i\sin\theta_i)^2 + (c_i\cos\theta_i)^2}, (i=1 \text{ to } n)$$

As can be seen from above equation, the norm of the complex value is the capacitance value $c_i$. Thus, the capacitance values $c_1$-$c_n$ of capacitive sensing nodes located at intersections of a plurality of drive lines and one sense line can be obtained without performing any phase delay measurement and compensation.

A simulation result of using the proposed method to detect capacitance values of capacitive sensing nodes located at intersections of five drive lines and the first sense line of a 5×3 touch panel is given as below. The aforementioned 5×5 driving matrix A may be referenced for stimulating the five drive lines during 5 time slots. The capacitive sensing nodes located at intersections of five drive lines and the first sense line are measured using measurement equipment, thereby producing the following capacitance measurement result.

$$x = \begin{bmatrix} 101\angle -0.39\pi \\ 114\angle -0.32\pi \\ 120\angle -0.27\pi \\ 117\angle -0.40\pi \\ 107\angle -0.44\pi \end{bmatrix}$$

The proposed method is used to detect the capacitive sensing nodes located at intersections of five drive lines and the first sense line. By demodulating the touch sense signals (which are obtained from the first sense line during 5 time slots, respectively) with the first oscillation signal $\sin(\omega t)$ and then performing matrix multiplication upon the demodulation output with the decoding matrix $D^{-1}$, the following result is obtained.

$$\begin{bmatrix} -95.03 \\ -96.25 \\ -90.01 \\ -111.27 \\ -105.10 \end{bmatrix}$$

In addition, by demodulating the touch sense signals (which are obtained from the first sense line during 5 time slots, respectively) with the second oscillation signal $\cos(\omega t)$ and then performing matrix multiplication upon the demodulation output with the decoding matrix $D^{-1}$, the following result is obtained.

$$\begin{bmatrix} 34.21 \\ 61.08 \\ 79.36 \\ 36.15 \\ 20.05 \end{bmatrix}$$

When outputs of the second multiplication unit 434 serves as real parts of complex values and outputs of the first multiplication unit 432 serves as real parts of complex values, the following complex values are obtained.

$$\begin{bmatrix} 34.21 - 95.03i \\ 61.08 - 96.25i \\ 79.36 - 90.01i \\ 36.15 - 111.27i \\ 20.05 - 105.10i \end{bmatrix}$$

The calculation unit 436 calculates the norm of each complex value, and therefore obtains the following calculation result.

$$\begin{bmatrix} 101 \\ 114 \\ 120 \\ 117 \\ 107 \end{bmatrix}$$

As one can see, the calculation result of the capacitance values is identical to the measurement result of the capacitance values. Thus, even though there is no phase delay measurement and compensation, the proposed method is capable of correctly determining the capacitance values at capacitive sensing nodes located at intersections of one sense line and multiple drive lines.

Figure 5:
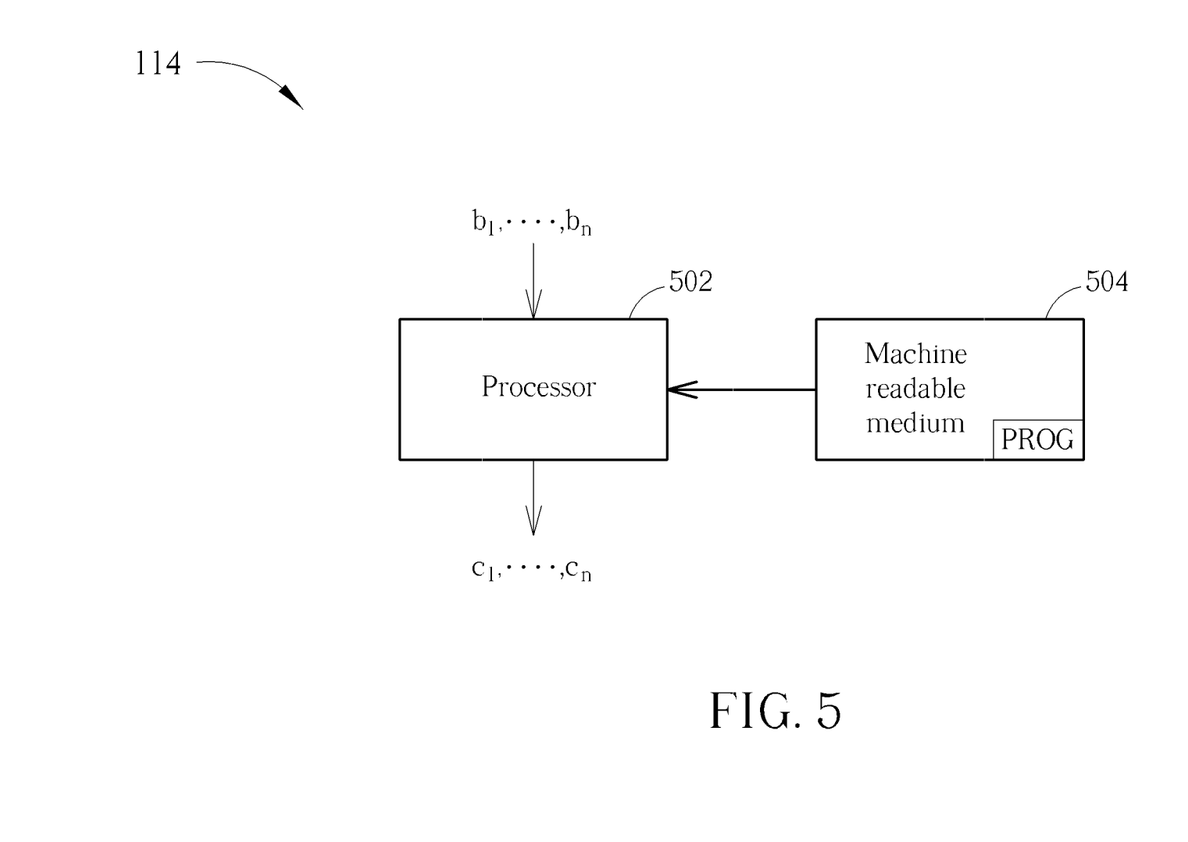
FIG. 5 is a diagram illustrating another embodiment of the control circuit shown in FIG. 1.

The control circuit 114 may be implemented using hardware, software, or a combination thereof. That is, the implementation shown in FIG. 4 is for illustrative purposes only. Please refer to FIG. 5, which is a diagram illustrating another embodiment of the control circuit 114 shown in FIG. 1. The control circuit 114 includes a processor 502 and a machine readable medium 504. The processor 502 may be implemented using a micro control unit (MCU) or a digital signal processor (DSP). The machine readable medium 504 is used to store a program code PROG, and may be implemented using a memory device such as a non-volatile memory. When executed by the processor 502, the program code PROG causes the processor 502 to accomplish the same operations performed by the circuit elements shown in FIG. 4.

To put it simply, the program code PROG causes the processor 502 to perform following steps for detecting capacitance values of a plurality of capacitive sensing nodes located at intersections of a plurality of drive lines and a sense line on a touch panel: demodulating a plurality of touch sense signals corresponding to the sense line with a first oscillation signal to generate a plurality of first demodulated signals, wherein the touch sense signals are obtained during a plurality of time slots, respectively; demodulating the touch sense signals with a first oscillation signal to generate a plurality of first demodulated signals; demodulating the touch sense signals with a second oscillation signal to generate a plurality of second demodulated signals, wherein the second oscillation signal is different from the first oscillation signal; and determining the capacitance values according to at least the first demodulated signals and the second demodulated signals. As a person skilled in the art can readily understand details of the implementation shown in FIG. 5 after reading above paragraphs directed to the implementation shown in FIG. 4, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting capacitance values of a plurality of capacitive sensing nodes located at intersections of a plurality of drive lines and a sense line on a touch panel, comprising:
   obtaining a plurality of touch sense signals corresponding to the sense line during a plurality of time slots, respectively;
   demodulating the touch sense signals with a first oscillation signal to generate a plurality of first demodulated signals;
   demodulating the touch sense signals with a second oscillation signal to generate a plurality of second demodulated signals, wherein the second oscillation signal is different from the first oscillation signal; and
   determining the capacitance values according to at least the first demodulated signals and the second demodulated signals;
   wherein each touch sense signal is obtained when the drive lines are simultaneously driven by a plurality of stimulation signals; during the time slots, stimulation signals are generated according to a common modulation carrier and a plurality of sign values defined in an encoding matrix; and the step of determining the capacitance values according to at least the first demodulated signals and the second demodulated signals comprises:
   performing matrix multiplication according to a decoding matrix and the first demodulated signals, and accordingly generating a plurality of first matrix elements, wherein the decoding matrix is an inverse of the encoding matrix;
   performing matrix multiplication according to the decoding matrix and the second demodulated signals, and accordingly generating a plurality of second matrix elements; and
   determining each capacitance value by calculating a root sum square (RSS) value of each pair of one first matrix element and one second matrix element.

2. The method of claim 1, wherein the first oscillation signal and the second oscillation signal have a same frequency but different phases.

3. The method of claim 2, wherein the first oscillation signal and the second oscillation signal have a 90-degree phase difference therebetween.

4. The method of claim 1, wherein the first oscillation signal, the second oscillation signal, and the stimulation signals have the same frequency.

5. The method of claim 1, wherein the stimulation signals and one of the first oscillation signal and the second oscillation signal have a same phase.

6. The method of claim 1, wherein the step of demodulating the touch sense signals with the first oscillation signal comprises:
   mixing each touch sense signal with the first oscillation signal to generate a first mixed signal; and
   performing a low-pass filtering operation upon the first mixed signal to generate a first demodulated signal; and
the step of demodulating the touch sense signals with the second oscillation signal comprises:
   mixing each touch sense signal with the second oscillation signal to generate a second mixed signal; and
   performing a low-pass filtering operation upon the second mixed signal to generate a second demodulated signal.

7. A touch controller for detecting capacitance values of a plurality of capacitive sensing nodes located at intersections of a plurality of drive lines and a sense line on a touch panel, comprising:
   a first demodulator, arranged for demodulating a plurality of touch sense signals corresponding to the sense line with a first oscillation signal to generate a plurality of first demodulated signals, wherein the touch sense signals are obtained during a plurality of time slots, respectively;
   a second demodulator, arranged for demodulating the touch sense signals with a second oscillation signal to generate a plurality of second demodulated signals, wherein the second oscillation signal is different from the first oscillation signal;
   a determining unit, arranged for determining the capacitance values according to at least the first demodulated signals and the second demodulated signals; and
   a driving circuit, arranged for simultaneously generating a plurality of stimulation signals to the drive lines during each time slot, wherein each touch sense signal is obtained when the drive lines are simultaneously driven by the stimulation signals, and during the time slots, the driving circuit generates stimulation signals according to a common modulation carrier and a plurality of sign values defined in an encoding matrix;
wherein the determining unit comprises:
   a first multiplication unit, arranged for performing matrix multiplication according to a decoding matrix and the first demodulated signals, and accordingly generating a plurality of first matrix elements, wherein the decoding matrix is an inverse of the encoding matrix;
   a second multiplication unit, arranged for performing matrix multiplication according to the decoding matrix and the second demodulated signals, and accordingly generating a plurality of second matrix elements; and
   a calculation unit, arranged for determining each capacitance value by calculating a root sum square (RSS) value of each pair of one first matrix element and one second matrix element.

8. The touch controller of claim 7, wherein the first oscillation signal and the second oscillation signal have a same frequency but different phases.

9. The touch controller of claim 8, wherein the first oscillation signal and the second oscillation signal have a 90-degree phase difference therebetween.

10. The touch controller of claim 7, wherein the first oscillation signal, the second oscillation signal, and the stimulation signals have the same frequency.

11. The touch controller of claim 7, wherein the stimulation signals and one of the first oscillation signal and the second oscillation signal have a same phase.

12. The touch controller of claim 7, wherein the first demodulator comprises:
- a first mixer, arranged for mixing each touch sense signal with the first oscillation signal to generate a first mixed signal; and
- a first low-pass filter, arranged for performing a low-pass filtering operation upon the first mixed signal to generate a first demodulated signal; and the second demodulator comprises:
- a second mixer, arranged for mixing each touch sense signal with the second oscillation signal to generate a second mixed signal; and
- a second low-pass filter, arranged for performing a low-pass filtering operation upon the second mixed signal to generate a second demodulated signal.

13. A non-transitory machine readable medium storing a program code which, when executed by a processor, causes the processor to perform following steps for detecting capacitance values of a plurality of capacitive sensing nodes located at intersections of a plurality of drive lines and a sense line on a touch panel:
- demodulating a plurality of touch sense signals corresponding to the sense line with a first oscillation signal to generate a plurality of first demodulated signals, wherein the touch sense signals are obtained during a plurality of time slots, respectively;
- demodulating the touch sense signals with a second oscillation signal to generate a plurality of second demodulated signals, wherein the second oscillation signal is different from the first oscillation signal; and
- determining the capacitance values according to at least the first demodulated signals and the second demodulated signals;

wherein each touch sense signal is obtained when the drive lines are simultaneously driven by a plurality of stimulation signals; during the time slots, stimulation signals are generated according to a common modulation carrier and a plurality of sign values defined in an encoding matrix; and the step of determining the capacitance values according to at least the first demodulated signals and the second demodulated signals comprises:
- performing matrix multiplication according to a decoding matrix and the first demodulated signals, and accordingly generating a plurality of first matrix elements, wherein the decoding matrix is an inverse of the encoding matrix;
- performing matrix multiplication according to the decoding matrix and the second demodulated signals, and accordingly generating a plurality of second matrix elements; and
- determining each capacitance value by calculating a root sum square (RSS) value of each pair of one first matrix element and one second matrix element.

14. The non-transitory machine readable medium of claim 13, wherein the first oscillation signal and the second oscillation signal have a same frequency, and there is a 90-degree phase difference between the first oscillation signal and the second oscillation signal.

* * * * *